United States Patent [19]

Kim

[11] Patent Number: 5,468,056
[45] Date of Patent: Nov. 21, 1995

[54] AUXILIARY BRAKE FOR AUTOMOBILE

[76] Inventor: Jae C. Kim, 441-1, Seongnae-3dong, Kangdong-ku, Seoul, Rep. of Korea

[21] Appl. No.: 334,247

[22] Filed: Nov. 4, 1994

[51] Int. Cl.⁶ .............................. B60T 17/00; F16L 55/04
[52] U.S. Cl. ................................................ 303/87; 138/30
[58] Field of Search ...................... 303/84.1, 87; 138/30, 138/31; 417/590; 73/707

[56] References Cited

U.S. PATENT DOCUMENTS

| | | | |
|---|---|---|---|
| 3,333,604 | 8/1967 | Birdwell | 138/30 |
| 4,312,382 | 1/1982 | Gebauev | 138/30 |
| 4,571,007 | 2/1986 | Carmichael et al. | |
| 4,571,009 | 2/1986 | Jones | 303/87 |
| 5,161,864 | 11/1992 | Cardenas et al. | 303/87 |
| 5,380,074 | 1/1995 | Jones | 303/87 |

FOREIGN PATENT DOCUMENTS 9210515  12/1992  Rep. of Korea.
9215568  3/1994  Rep. of Korea.

*Primary Examiner*—Robert J. Oberleitner
*Assistant Examiner*—Chris Schwartz
*Attorney, Agent, or Firm*—Warner Norcross & Judd

[57] ABSTRACT

A pressure compensator for an automobile brakeline is disclosed. The pressure compensator includes an upper housing having an inner surface that is approximately conic and has a plurality of serial recesses and protrusions. A resilient rubber having a supporting portion and a recess for containing pressurized nitrogen gas is supported below the upper housing by a lower housing. The rubber also includes an approximately conic upper operating portion that engages the recesses and protrusions of the upper housing to facilitate the balancing of oil pressure.

4 Claims, 4 Drawing Sheets

5,468,056

AUXILIARY BRAKE FOR AUTOMOBILE

BACKGROUND OF THE INVENTION

The present invention relates to an auxiliary brake employed when a main brake system for an automobile operates, and more particularly, to an auxiliary brake which operates smoothly even when a high brake operating pressure is applied thereto.

Generally, an auxiliary brake is called an ABS brake. Related techniques are disclosed in Korean Patent No. 1992-10515, U.S. Pat. Nos. 343,066, 4,571,007 and 5,161,864. The applicant filed Korean Utility Model No. 15568. These apparatuses are designed to maintain the pressure balance of operation oil applied to a brake system in operating a main brake.

They usually have a housing that oil enters, including a resilient rubber and operating gas for maintaining the pressure balance of oil.

Those apparatuses are constructed with a plate-shaped resilient rubber interposed in an oil operating space, or with a resilient rubber that defines a space for receiving operating oil. In either construction, the surface area of the rubber subjected to the operating oil remains constant regardless of the operating pressure of the oil. For this reason, there is a limit in coping with the pressure variation of brake operating oil. Specifically, according to the pressure variation of brake operating oil, the resilient rubber should work elastically in order to accomplish the pressure balance of oil. However, the resilience action of the rubber reaches its limit when the operating oil pressure is high above a predetermined level. As a result, the resilient rubber does not function properly at high operating pressures.

SUMMARY OF THE INVENTION

Therefore, in order to overcome such a problem, it is an object of the present invention to provide an auxiliary brake for an automobile in which the surface area of a resilient diaphragm or rubber subjected to operating oil increases gradually as the pressure of the brake operating oil increases. Consequently, the resilience action of the resilient rubber works uniformly independent of whether the oil pressure is high or low.

To accomplish the object of the present invention, there is provided a first embodiment of an auxiliary brake for an automobile comprising an upper housing having an oil line connecting member that oil enters and discharges from and an oil passage extending from the oil line connecting member; a resilient rubber that cooperates with the upper housing to define an oil operating space that oil freely enters and discharges from via the oil passage; and a lower housing that supports the rubber below the upper housing. The inner surface of the upper housing is approximately conic and has a plurality of serial recesses and protrusions. The resilient rubber includes a recess formed on the lower portion thereof for containing a pressurized nitrogen gas. In addition, the rubber includes an approximately conic upper operating portion and a supporting portion that is inserted into the lower housing.

To accomplish the object of the present invention, there is provided a second embodiment of an auxiliary brake for an automobile comprising an upper housing having an oil line connecting member that oil enters and discharges from and an oil passage extending from the oil line connecting member; a resilient rubber that cooperates with the upper housing to define an oil operating space that oil freely enters and discharges from via the oil passage; an oil flow guiding piece having an oil flow way inserted above the resilient rubber; and a lower housing that supports the rubber below the upper housing. In this embodiment, the inner surface of the upper housing is approximately conic and includes a plurality of serial recesses and protrusions. In addition, the inner top surface of the upper housing is cylindrical. As with the first embodiment, the resilient rubber includes a recess for containing a pressurized nitrogen gas and a supporting portion inserted into the lower housing. The rubber also includes an approximately head-cut conic upper operating portion which seats the oil flow guiding piece. An oil passing gap is formed between the side outer circumference of the oil flow guiding piece and the cylindrical surface of said upper housing.

In the present invention, in order for operating oil to gradually enter the oil operating space, the inner surface of the upper housing is formed with a plurality of recesses and protrusions and a conic resilient rubber is provided. As the brake is operated, the pressure of the operating oil is balanced by the repeated resilience action of the rubber. As a result, even when high pressure of operating oil is applied to the resilient rubber, the resilient rubber retains a corresponding resilience action.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
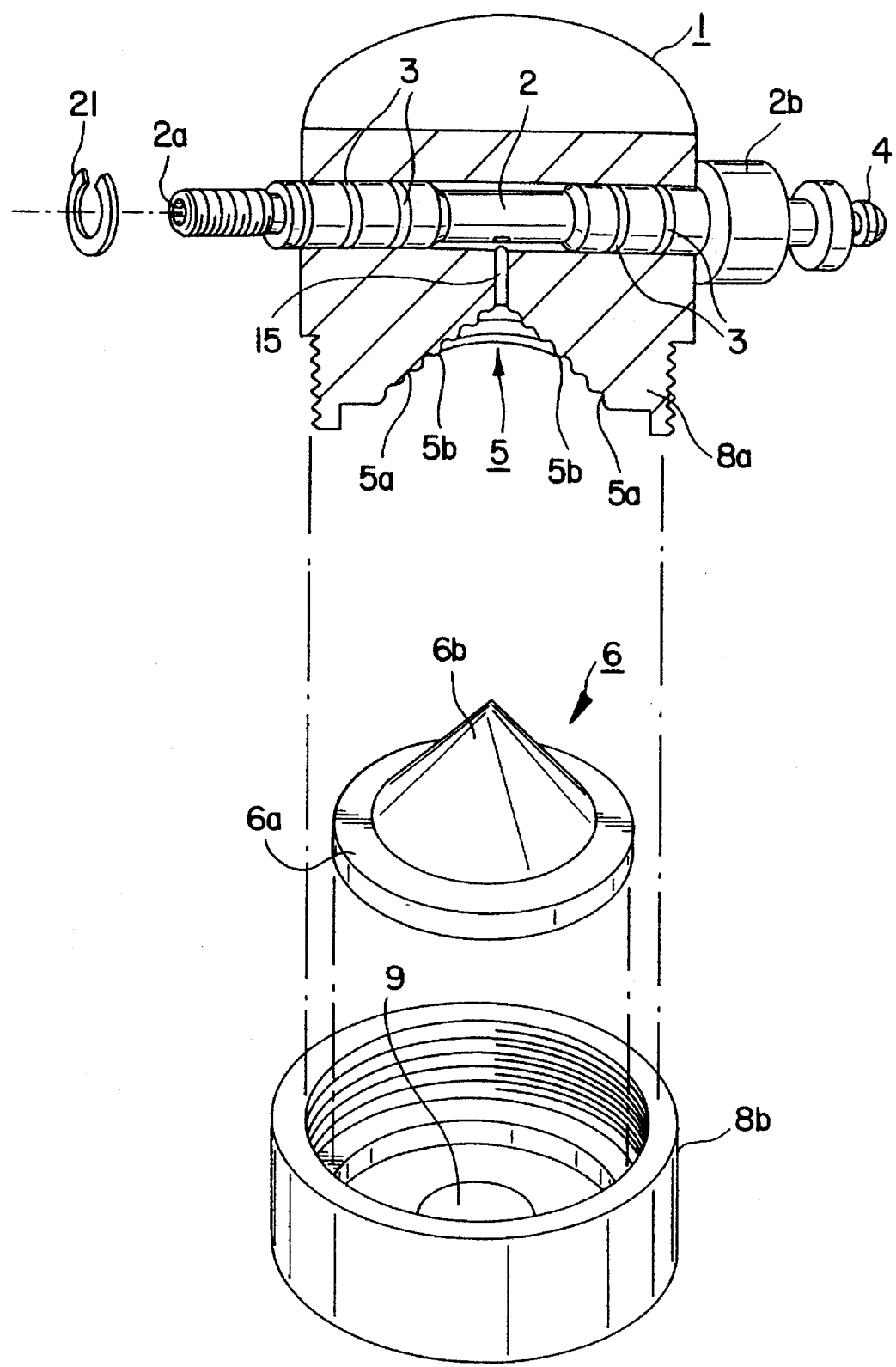
FIG. 1 is a partially cutaway exploded perspective of a first embodiment of an auxiliary brake system.
Figure 2:
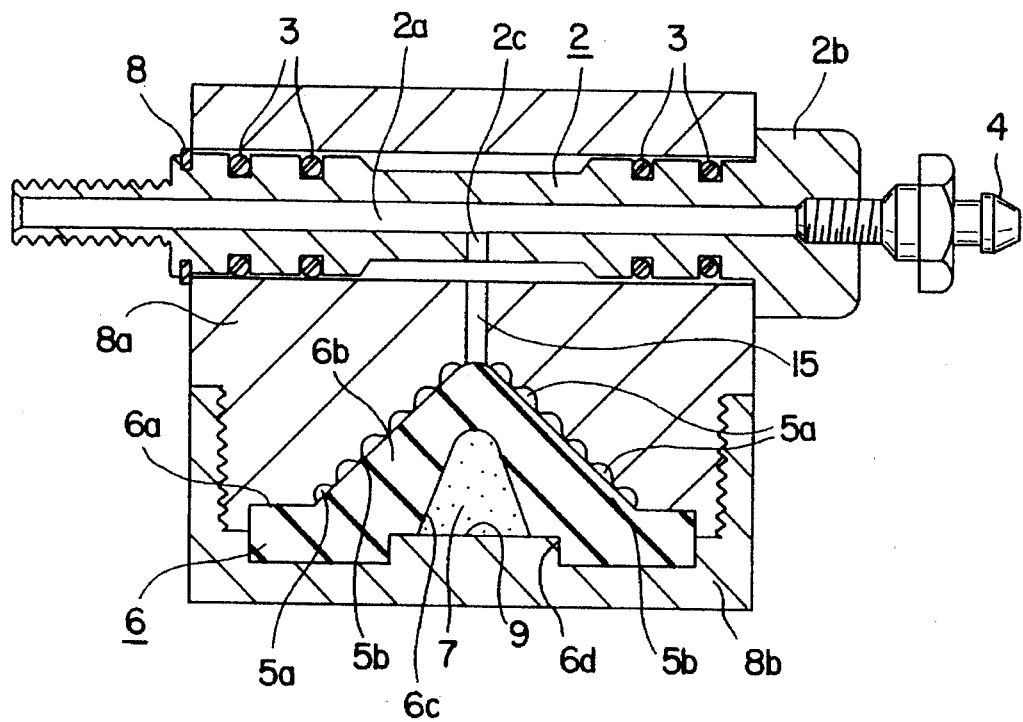
FIG. 2 is a sectional view of a coupled state of the system of FIG. 1.
Figure 3A:
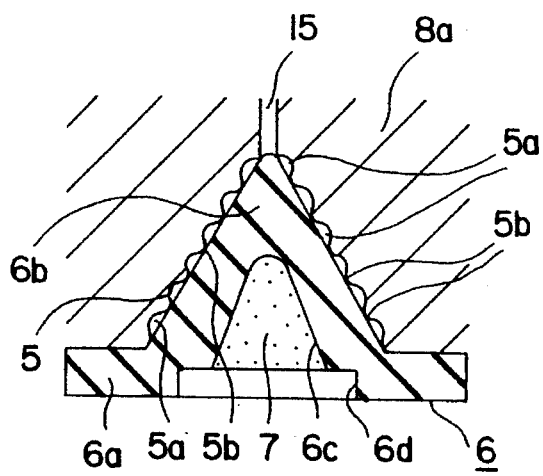
FIG. 3 is a sectional view of an operation state of the first embodiment of the present invention.
Figure 3B:
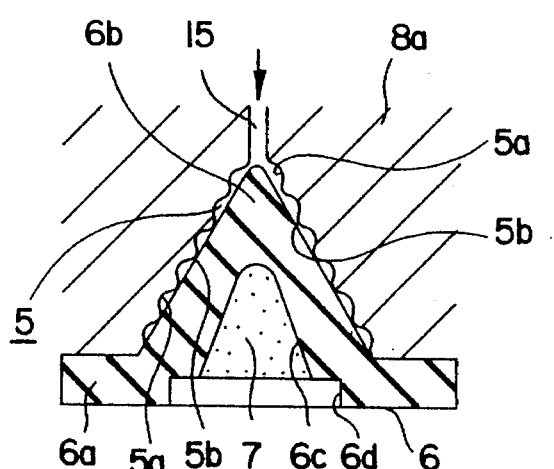
Figure 4:
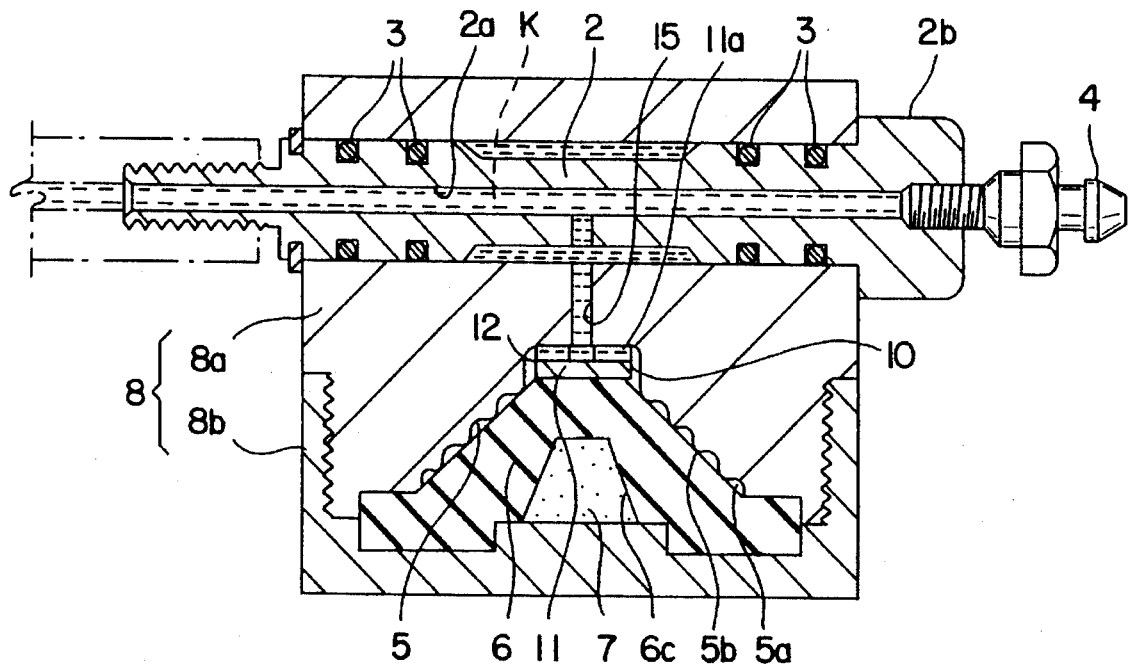
FIG. 4 is a sectional view of a second embodiment of the present invention.
Figure 5:
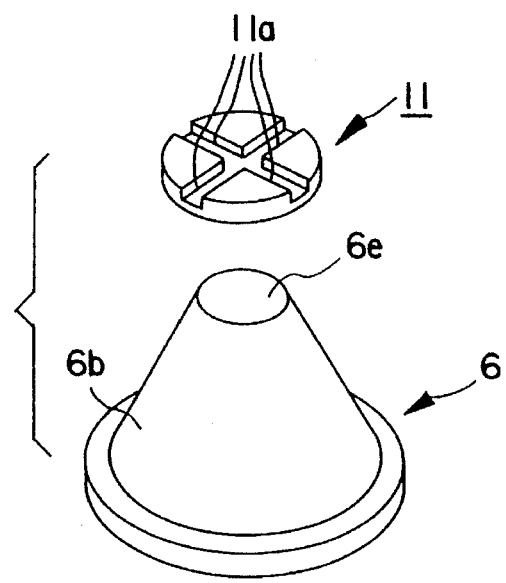
FIG. 5 is a perspective of a resilient rubber and oil flow guiding piece of the second embodiment of the present invention.
Figure 6:
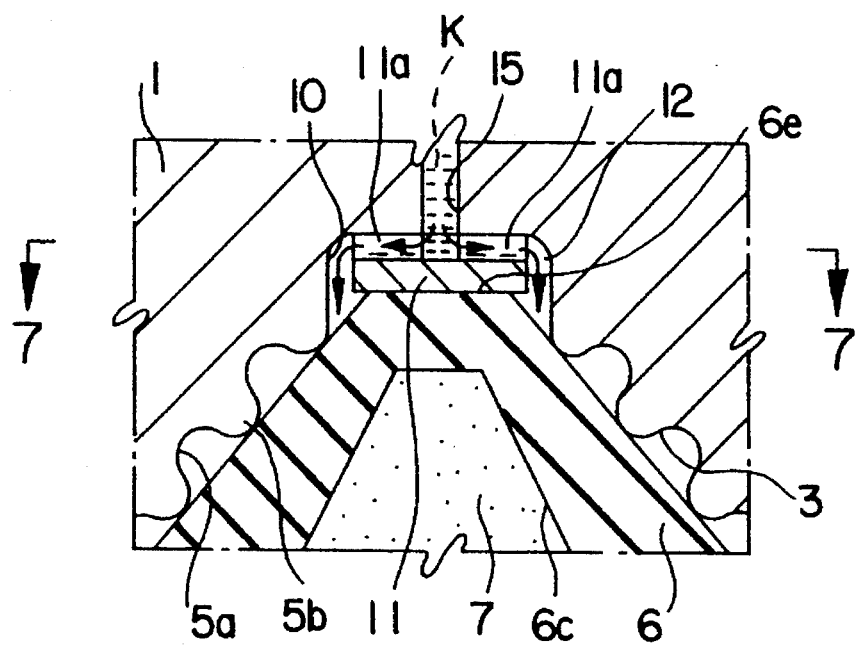
FIG. 6 illustrates the flow of operating oil of the second embodiment of the present invention.
Figure 7:
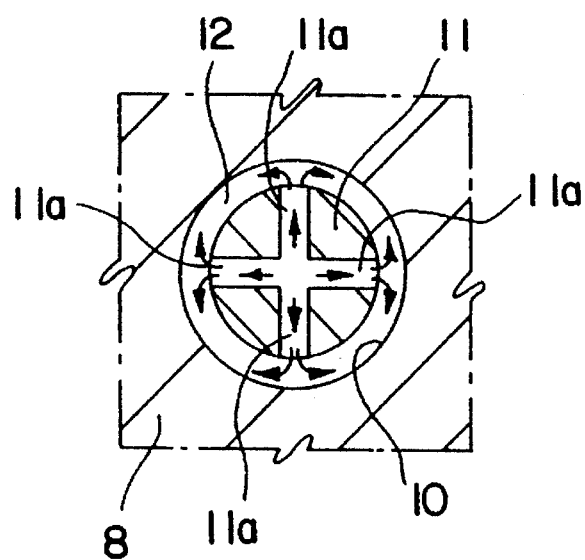
FIG. 7 is a sectional view of FIG. 6 cut along with line A–A'.

FIGS. 1, 2 and 3 illustrate the first embodiment of the present invention. Referring to the drawings, a housing is divided into an upper housing 8a and a lower housing 8b which are fabricated in a screw fastening way.

An oil line connecting member 2 having an oil passage 2a is provided above upper housing 8a so that oil leakage is prevented by a tight packing 3. An air-removing bolt 4 is fastened to a bolt head 2b.

An entrance hole 2c penetrates the middle of oil passage 2a of oil line connecting member 2 so that operating oil is supplied through housing oil passage 15. A conic oil operating space 5 which is broadened downward is formed under housing oil passage 15. A plurality or recesses 5a and protrusions 5b are formed serially on the inner surface of upper housing 8a which defines a portion of oil operating space 5.

A resilient diaphragm or rubber 6 supported by lower housing 8b is inserted into oil operating space 5. The resilient rubber 6 comprises a supporting portion 6a inserted into lower housing 8b. A conic upper operating portion 6b is projected above supporting portion 6a. A cavity 6c is formed on the bottom surface of supporting portion 6a, thereby serving as a gas chamber. This gas chamber is filled with nitrogen gas 7 under pressure. A central protrusion 9 of lower housing 8b is fitted into lower recess 6d.

Reference number 8 represents a snap ring for fastening oil line connecting bolt 2.

In this configuration, when a brake operates, increased oil pressure causes operating oil to enter oil operating space 5 along oil passages 2a and 15. The pressure of the entering oil compresses resilient rubber 6.

When the resilient rubber is fully compressed, the operating oil is discharged back by the relative resilience action of the resilient rubber. Here, nitrogen gas 7 facilitates the resilience action of resilient rubber 6. Sequential entrance and discharge actions (12 times per one second) operate the brake repeatedly so that the pressure of operating oil is balanced.

In this embodiment, under the initial pressure of operating oil, the operating oil pushes the upper portion of the resilient rubber from state A to state B of FIG. 3 and enters recess 5a. Here, as the pressure of operating oil increases, the number of recess 5a through which the operating oil flows into increases.

In other words, if the pressure of the operating oil increases, the operating oil will deform resilient rubber 6 until coming into contact with protrusion 5b and flowing into a succeeding recess 5a. In order to make the operating oil flow further, higher oil pressure is required. When the operating oil pushes resilient rubber 6 and enters a succeeding recess 5a along protrusion 5b, the pressure fluctuation of operating oil where the pressure is instantly lowered occurs so that a brake shoe or lining operates the brake discontinuously.

Further, in the embodiment of the present invention, under an initial pressure at a normal level, the operating oil fluctuates due to the resilience action of the upper portion of resilient rubber 6. Under an oil pressure higher than this, a resilience action takes place due to the resilience force of the upper portion of the resilient rubber and the middle thereof where oil enters recess 5a and the pressure applied by nitrogen gas 7 of cavity 6c.

Under a very high oil pressure, resilient rubber 6 approaches central protrusion 9 with high pressure. Then, resilient rubber 6 has a self-resilient action gradually from the bottom due to a reversely occurring gas pressure and the repulsive resilience force of resilient rubber 6 so that a smooth braking is performed by the pressure fluctuation and balancing due to the pressure variation of operating oil.

In FIGS. 4–7 illustrating the second embodiment of the present invention, a cylindrical surface 10 is formed at the top of oil operating space 5 connected to housing oil passage 15. The diameter of the cylindrical surface is designed to be over twice greater than that of housing oil passage 15.

An oil flow guiding piece defining a crossed oil flow way 11a is inserted into the void defined by cylindrical surface 10. The diameter of oil guiding piece 11 is slightly smaller than that of cylindrical surface 10. An oil passing gap 12 is placed between cylindrical surface 10 and the outer circumference of oil flow guiding piece 11. Oil flow guiding piece 11 is stably supported on head-cut surface 6e of resilient rubber 5.

This embodiment of the present invention is designed to facilitate the entrance and discharge of operating oil as explained above. The operating oil entering oil passage 15 is guided to the periphery along oil flow way 11a of oil flow guiding piece 11 placed just under oil passage 15, and then enters or discharges from oil operating space 5 via oil passing gap 12. This helps operating oil enter or discharge from oil operating space 5.

Further, in this embodiment, the pressure of operating oil operates the brake and at the same time works throughout oil flow guiding piece 11. Furthermore, the operating oil pressure is dispersed along crossed oil flow way 11a so that it is transmitted uniformly to resilient rubber 6 and the oil pressure is balanced.

In this invention, the operating area of operating oil pressure applied to the resilient rubber 6 is gradually broadened as the pressure of operating oil increases. The operating oil entering the oil operating space 5 does not work throughout the entire resilient rubber 6 as with conventional technology. Accordingly, the resilience action of the resilient rubber 6 increases so that even if a very high pressure of operating oil above a predetermined level is applied to resilient rubber 6, resilience action of resilient rubber 6 is enabled. Therefore, the rubber does not fail to provide the appropriate resilience action at high operating pressure and further .enhances the reliability of products.

Moreover, in the second embodiment of the present invention, since a metal entrance/discharge guiding piece is interposed between oil passage 4 and resilient rubber 5, operating oil is easy to disperse through crossed oil flow way. This enables oil pressure to be balanced, resulting in a more reliable and improved products.

I claim:

1. A pressure compensator for use with an auxiliary brake for an automobile, comprising:

an upper housing having an approximately conic inner surface defining a plurality of circumferential recesses;

a resilient diaphragm having an approximately conic upper operating portion cooperating with said inner surface to define an oil operating space and whereby said recess allow said diaphragm to provide a desired pressure compensation over a greater range of operating oil pressures;

a lower housing supporting said diaphragm and mounted to said upper housing; and an oil line connecting means for allowing oil to flow into and out of said oil operating space.

2. A pressure compensator for use with an auxiliary brake for an automobile, comprising:

an upper housing having an approximately conic inner surface defining a plurality of circumferential recesses;

an oil flow guiding piece having an oil flow way;

a resilient diaphragm having an approximately conic upper operating portion cooperating with said inner surface to define an oil operating space, said upper operating portion shaped in a head-cut cone to seat said oil flow guiding piece;

a lower housing supporting said diaphragm and mounted to said upper housing; and an oil line connecting means for allowing oil to flow into and out of said oil operating space;

whereby said oil flow guiding piece and said inner surface define an oil passing gap communicating with said oil flow way for allowing oil to flow to said diaphragm.

3. The component of claim 2 wherein said oil flow way includes crossed flow passages.

4. The component of any of claims 1-3 wherein said lower housing includes a central protrusion; and wherein said central protrusion is inserted into a recess formed in said diaphragm.

\* \* \* \* \*

UNITED STATES PATENT AND TRADEMARK OFFICE
CERTIFICATE OF CORRECTION

PATENT NO. : 5,468,056
DATED : November 21, 1995
INVENTOR(S) : Kim

It is certified that error appears in the above-indentified patent and that said Letters Patent is hereby corrected as shown below:

Column 4, Claim 1, Line 33:
    "recess" should be --recesses--

Column 4, Claim 3, Line 58:
    "component" should be --pressure compensator--

Column 4, Claim 4, Line 60:
    "component" should be --pressure compensator--

Signed and Sealed this

Fifth Day of March, 1996

Attest:

BRUCE LEHMAN

*Attesting Officer*          Commissioner of Patents and Trademarks